April 23, 1963 G. R. STEELE 3,086,660
SHELF PANEL FOR STORAGE RACKS
Filed Jan. 15, 1962 2 Sheets-Sheet 1
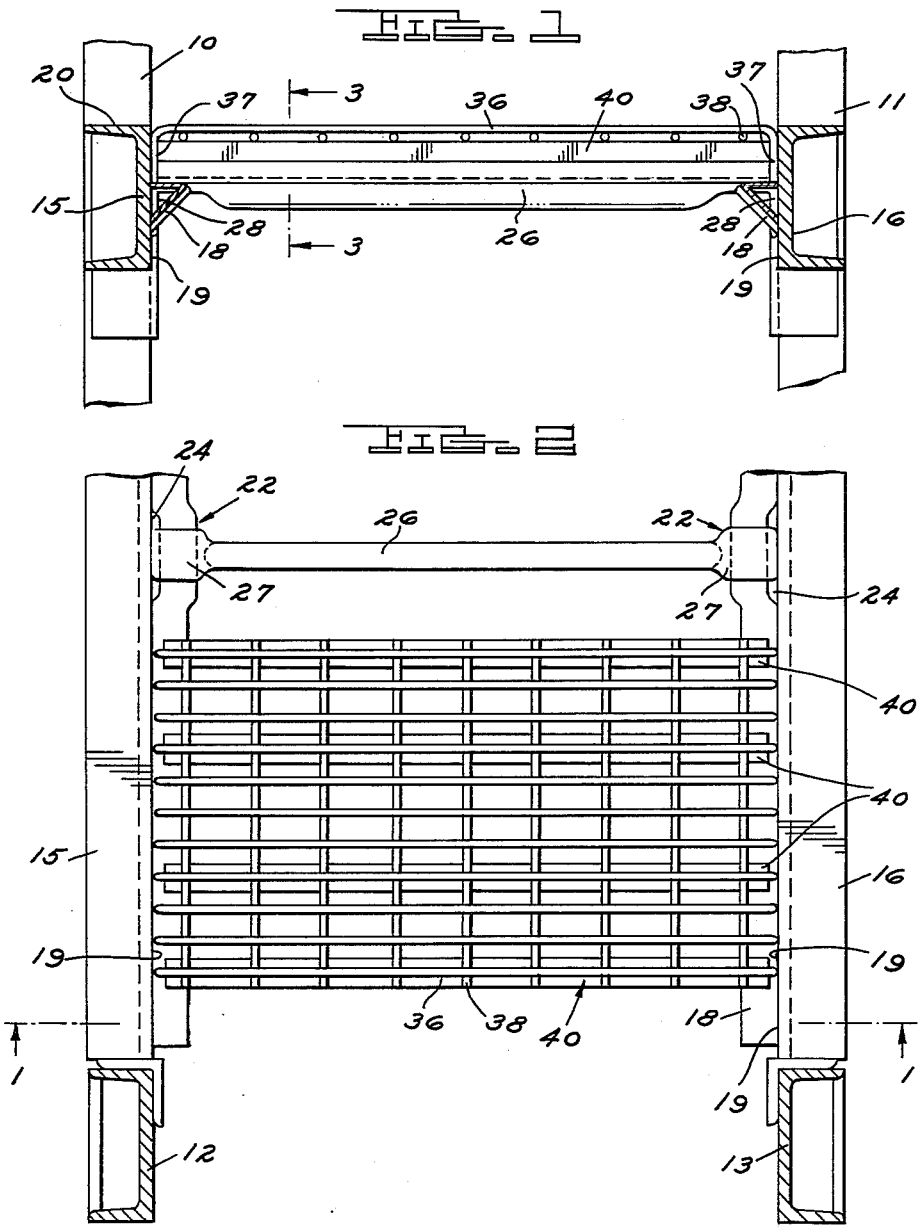
INVENTOR.
GLEN R. STEELE
ATTORNEYS

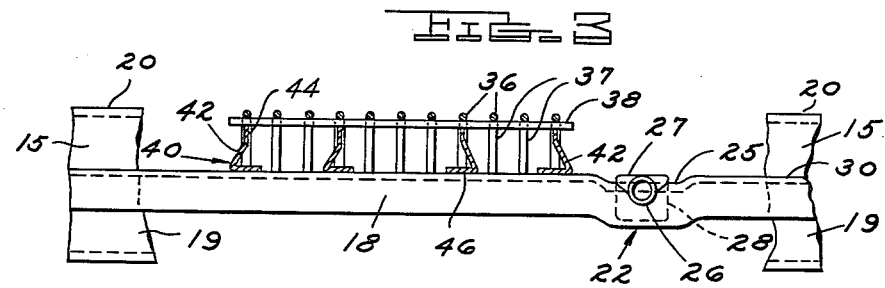
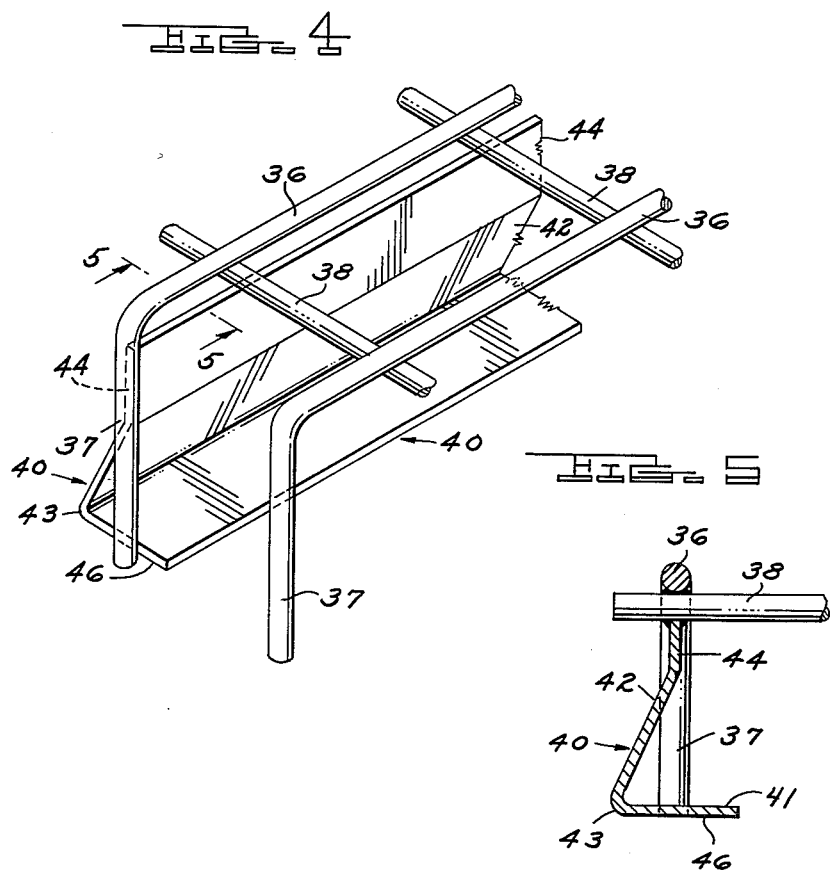

United States Patent Office 3,086,660
Patented Apr. 23, 1963

3,086,660
SHELF PANEL FOR STORAGE RACKS
Glen R. Steele, Plymouth, Mich., assignor to Bathey Manufacturing Company, Plymouth, Mich., a corporation of Michigan
Filed Jan. 15, 1962, Ser. No. 166,126
5 Claims. (Cl. 211—153)

This invention relates to an improved construction for a mesh panel used to form a shelf between a pair of spaced horizontal rails of a storage rack.

The overall object of the invention is to provide a shelf panel having maximum strength for a given amount of material, hence minimum weight, and which can be fabricated at relatively low cost so as to be competitive with lumber conventionally employed for storage rack shelving considering the additional advantages obtained from the construction of the invention including increased durability, greater strength, cleanliness and others which will be pointed out hereinafter. Rack shelving is subjected to such extremely rough usage that conventional wire mesh constructions have proved unsatisfactory, not possessing sufficient strength and rigidity to withstand the shocks encountered in the handling of loads on and off a shelf unless made of such heavy material as to be impractical for commercial usage.

According to the invention, a mesh panel comprises one series of rods adapted to extend transversely between a pair of rack side rails, the upper surfaces of these rods defining the plane of the shelf. A second series of rods are placed beneath the first series at right angles thereto forming a mesh grid with the rods of the first and second series being joined together where they cross, as by welding. A number of reinforcing members less than the number of the rods of the first series are positioned in spaced relation below the second series of rods and extending parallel to the first series of rods, there being one or more first rods intermediate adjacent reinforcing members. Each reinforcing member is placed in vertical alignment with one of the first series of rods and is joined to the underside of each rod of the second series thereby forming a transverse beam section the depth of which is increased by the second series of rods. The rods of the first series are each provided with down-turned ends extending to the level of the bottom of the reinforcing members for engagement with the rack side rails so that every rod of the first series of article supporting rods engages the rack side rails.

Preferably the reinforcing members are of a special reverse angle section, having a horizontal base portion and a generally vertical portion which extends upwardly from one edge of the base portion at an acute angle thereto with the upper edge of this vertical portion being located intermediate the edges of the base portion. Another preferred feature is that a reinforcing member is employed under the first and last rods of the first series thereby defining the sides of the mesh panel, with each such side reinforcing member being mounted so that the vertical portion thereof extends inwardly and upwardly of a side of the mesh panel. These side reinforcing members thereby act as spacers to define the position of an adjacent panel and make it easy to install and remove panels without getting the rods thereof entangled.

A further preferred feature, especially useful with racks of the type whose side rails are provided with shelf supporting ledges having a horizontal supporting surface and a vertical locating surface, results from dimensioning the shelf panel of the invention so that the down-turned edges of the transverse rods frictionally engage the vertical locating surface of the shelf supporting ledge of each side rail. These down-turned edges of the rods are somewhat resilient and will thus securely and frictionally engage the rack side rails to locate the shelf panel therebetween. An improved ledge construction for side rails of this type includes an easily detachable cross-tie which can be employed for interconnecting the rack side rails without interfering with the positioning of shelf panels therebetween, but which will positively prevent the side rails from spreading apart either as a result of the frictional engagement of the shelf panels therewith, or from heavy loading.

Other objects and advantages of the invention will appear from the following description of the presently preferred embodiment thereof shown in the accompanying drawings which consist of the following views:

FIGURE 1, a fragmentary sectional elevation taken as indicated by the line 1—1 of FIG. 2 through the side rails of a rack construction illustrating the shelf panel of the invention supported between the side rails;

FIGURE 2, a fragmentary sectional plan view thereof taken through the opposite end pair of uprights;

FIGURE 3, a sectional elevation taken as indicated by the line 3—3 of FIG. 1;

FIGURE 4, an enlarged perspective view showing one corner of the shelf panel; and FIGURE 5, a sectional detail taken as indicated by the line 5—5 of FIG. 4.

Referring to FIGS. 1 and 2, portions of a storage rack structure are shown including corner uprights 10, 11 (FIG. 1) at one end of the rack and 12, 13 (FIG. 2) at the other end between which a pair of horizontal side rails 15 and 16 are supported, being connected to the uprights by any of the well known forms of connection employed for this purpose. A shelf support 18 is secured to the inner face 19 of each of the side rails 15 and 16 at a distance below the upper horizontal surface 20 thereof corresponding to the depth of shelving members.

As shown in FIGS. 2 and 3, each of the shelf supports 18 is provided with a horizontally and vertically offset portion 22 at a desired location or locations intermediate the ends of the side rails thereby forming a vertically extending slot 24 (FIG. 2) between the inner face 19 of a side rail and the shelf support 18 and a horizontal depression 25 (FIG. 3) in the upper surface 30 of the shelf support 18. This offset portion 22 in each of the shelf supports thus forms a connection for a tubular tie bar 26 each end of which is flattened at 27 and turned downwardly at 28 so as to be engageable in the depression 25 and in the slot 24 between the side rail and the shelf support.

The shelf panel of the invention consists of a first series of upper, article contacting rods 36, each provided with down-turned ends 37, which extend in spaced parallel relation between the side rails 15 and 16. A second series of rods 38 extend transversely beneath the rods 36, each rod 38 being joined to each of the rods 36. The structure is completed by a number of reinforcing members 40, less than the number of rods 36, which are located in spaced relation, each reinforcing member 40 extending below and parallel to one of the rods 36.

As best shown in FIG. 5, the reinforcing members 40 are formed with what may be termed a reverse angle sectional configuration including a lower horizontal base portion 41 and a vertical web which includes a portion 42 extending upwardly of the base portion at an acute angle to the edge 43 thereof and a short upper vertical portion 44. Each reinforcing member 40 is connected to each of the transverse rods 38 as by welding. Preferably, a reinforcing member 40 is positioned under the first and last of the rods 36, or in other words along the sides of the panel, and as best shown in FIG. 3, these side reinforcing members are mounted so that their inclined portions 42 extend inwardly of the panel, thereby acting as guides and spacers to aid in the positioning of panels adjacent each other.

Thus the panel structure is composed of a minimum number of parts which individually may be of relatively light construction but which when assembled form a very rigid unit. It will be noted from FIG. 5 that the combination of a reinforcing member 40 and one of the rods 36 forms a beam section, the depth and hence the strength of which is increased by the intervening transverse rods 38 between the upper portion 44 of the reinforcing member and the rods 36. The down-turned ends 37 of the rods 36 are dimensioned so as to extend to the level of the bottom surface 46 of the reinforcing members 40 so that these down-turned ends act as supports for each of the rods 36, engaging the upper surface 30 of the shelf support 18 as shown in FIG. 3. In other words, each of the transverse rods 36 which form the upper load supporting and contacting area of the shelf panel are individually supported by and upon their down-turned ends 37.

In a rack construction of the type shown where shelf panels are supported on ledges provided on the rack side rails, the down-turned ends 37 will normally frictionally and somewhat resiliently engage the inner surface 19 of the side rails thus securing the shelf panel in position. This frictional engagement between each shelf panel and the shelf supporting ledges of the rack structure is insured by the tie bar construction which prevents the rack side rails 15 and 16 from spreading apart.

The reverse angle section of the reinforcing members not only adds to their strength and stability, but also has the incidental advantage of being relatively self-cleaning in that the amount of dirt which can collect on the horizontal base portion 41 is minimized.

This shelf panel construction is relatively easy to fabricate in commercial practice. As pointed out above a minimum number of parts are involved all of which can easily be made to any desired dimension, and with suitable equipment commercially available these parts can be welded together over a large area of the panel in one operation.

While preferred embodiments have been described above in detail, it will be understood that numerous modifications might be resorted to without departing from the scope of the invention as defined in the following claims.

I claim:

1. A mesh panel for forming a shelf between a pair of spaced horizontal rails of a storage rack, said panel comprising a first series of parallel spaced rods adapted to extend between said rails, a second series of rods extending in parallel spaced relation transversely beneath the rods of the first series, means joining the rods of the first and second series together where they cross each other, a plurality of reinforcing members less than the number of rods of the first series extending parallel thereto below the rods of the second series, each of said reinforcing members being located in vertical alignment with one rod of the first series and being connected to the underside of each rod of the second series thereby forming a plurality of beam sections extending across said panel, and the rods of the first series each being provided with down-turned ends extending to the level of the bottom of said reinforcing members for engagement with said rails.

2. A mesh panel according to claim 1 further characterized by each of said reinforcing members having a horizontal base portion and a generally vertical portion extending upwardly from one edge of said base portion at an acute angle thereto, the upper edge of said vertical portion being above and intermediate the edges of said base portion and being connected to the rods of the second series.

3. A mesh panel according to claim 2 wherein one of said reinforcing members is located under the first and last rods of the first series thereby defining the sides of said panel, such side reinforcing members each being mounted with the said vertical portion thereof extending inwardly and upwardly of a panel side.

4. A shelf construction for a storage rack structure comprising the combination of a pair of spaced horizontal rails forming part of said rack structure, said rails having facing vertical surfaces, a shelf support secured to the vertical surface of each rail below the upper edge thereof forming a shelf supporting ledge, said shelf support having an offset portion intermediate the rail ends which is depressed below the surface of said ledge and spaced from the vertical rail surface; a mesh shelf panel having a series of upper parallel spaced rods extending between said rails, a second series of rods extending transversely below the upper rods in parallel spaced relation and connected to the upper rods, said upper rods each being provided with down-turned ends bearing on the shelf supporting ledges and frictionally engaging the vertical rail surfaces above said ledges; and a tie bar having end portions detachably engageable in the offset portions of said shelf supports for maintaining the spacing between said rails.

5. A shelf construction according to claim 4 further characterized by said shelf panel including a plurality of reinforcing members, each of said reinforcing members extending below and being connected to the rods of the second series in vertical alignment with one of said upper rods, the ends of each reinforcing member being located adjacent to the down-turned ends of the upper rod with which it is aligned and engaging said self-supporting ledges.

References Cited in the file of this patent

UNITED STATES PATENTS

| | | |
|---|---|---|
| 1,944,207 | Bates | Jan. 23, 1934 |
| 2,076,099 | Smith | Apr. 6, 1937 |
| 2,710,160 | Bitney | June 7, 1955 |